United States Patent
Ueno et al.

(10) Patent No.: US 12,053,959 B2
(45) Date of Patent: Aug. 6, 2024

(54) POLYPROPYLENE MULTILAYER SHEET (71) Applicants: FP CORPORATION, Hiroshima (JP); SunAllomer Ltd., Tokyo (JP)

(72) Inventors: Shingo Ueno, Hiroshima (JP); Takeshi Nakajima, Kanagawa (JP); Masayuki Ikeda, Kanagawa (JP)

(73) Assignee: FP CORPORATION AND SUNALLOMER LTD., Tokyo (JP)

( * ) Notice: Subject to any disclaimer, the term of this patent is extended or adjusted under 35 U.S.C. 154(b) by 0 days.

(21) Appl. No.: 18/036,373

(22) PCT Filed: Nov. 11, 2021

(86) PCT No.: PCT/JP2021/041525
§ 371 (c)(1),
(2) Date: May 10, 2023

(87) PCT Pub. No.: WO2022/102706
PCT Pub. Date: May 19, 2022

(65) Prior Publication Data
US 2024/0001652 A1 Jan. 4, 2024

(30) Foreign Application Priority Data
Nov. 13, 2020 (JP) .................. 2020-189251

(51) Int. Cl.
| | | |
|---|---|---|
| B32B 27/08 | (2006.01) | |
| B29C 48/00 | (2019.01) | |
| B32B 7/02 | (2019.01) | |
| B32B 27/20 | (2006.01) | |
| B32B 27/32 | (2006.01) | |
| B65D 65/40 | (2006.01) | |
| C08F 110/06 | (2006.01) | |
| C08K 3/34 | (2006.01) | |
| B29K 23/00 | (2006.01) | |
| B29K 509/00 | (2006.01) | |

(52) U.S. Cl.
CPC .......... *B32B 27/08* (2013.01); *B29C 48/0021* (2019.02); *B32B 7/02* (2013.01); *B32B 27/20* (2013.01); *B32B 27/32* (2013.01); *B65D 65/40* (2013.01); *C08F 110/06* (2013.01); *C08K 3/34* (2013.01); *B29K 2023/12* (2013.01); *B29K 2509/00* (2013.01); *B29K 2995/0053* (2013.01); *B32B 2250/242* (2013.01); *B32B 2250/40* (2013.01); *B32B 2264/10* (2013.01); *B32B 2264/201* (2020.08); *B32B 2307/306* (2013.01); *B32B 2307/518* (2013.01); *B32B 2307/54* (2013.01); *B32B 2307/546* (2013.01); *B32B 2307/558* (2013.01); *B32B 2307/7376* (2023.05); *B32B 2439/02* (2013.01)

(58) Field of Classification Search
CPC ..... B29C 43/52; B29C 48/0021; B29K 23/00; B29K 2023/12; B32B 27/08; B32B 27/32; B32B 27/20; B32B 7/02; B32B 2307/518; B32B 2307/7376; B32B 2264/201; B32B 2250/40; B32B 2307/54; B32B 2307/546; B32B 2307/306; B32B 2250/242; B65D 65/40; C08F 110/06; C08K 3/34

See application file for complete search history.

(56) References Cited

U.S. PATENT DOCUMENTS

| | | |
|---|---|---|
| 2013/0196168 A1 | 8/2013 | Hikosaka et al. |
| 2021/0387396 A1 | 12/2021 | Nakajima et al. |

FOREIGN PATENT DOCUMENTS

| | | | |
|---|---|---|---|
| CN | 104761813 | A | 7/2015 |
| CN | 110121528 | A | 8/2019 |
| JP | H05262897 | A | 10/1993 |
| JP | H10291284 | A | 11/1998 |
| JP | 2012096526 | | 5/2012 |
| JP | 2012158107 | | 8/2012 |
| JP | 2012158107 | A * | 8/2012 |
| JP | 2013103369 | | 5/2013 |

(Continued)

OTHER PUBLICATIONS

International Search Report for International Application No. PCT/JP2021/041525, mailed Jan. 25, 2022, 2 pages.

(Continued)

*Primary Examiner* — Robert D Harlan
(74) *Attorney, Agent, or Firm* — Workman Nydegger (57) ABSTRACT

A polypropylene multilayer sheet includes:
a biaxially oriented polypropylene layer F having a melting point TmF; and
a biaxially oriented polypropylene layer N having a melting point TmN,
the biaxially oriented polypropylene layer N and the biaxially oriented polypropylene layer F being alternately laminated,
the polypropylene multilayer sheet having a thickness of 0.15 mm to 3.0 mm, wherein:

TmF>TmN, a total number of layers is 3 to 11,
the biaxially oriented polypropylene layer F is formed of a resin composition containing: a polypropylene-based resin as a component (A); and an inorganic filler as a component (B),
a weight ratio of the component (B)/[the component (A)+the component (B)] is 0.5 to 60 wt %,
the biaxially oriented polypropylene layer N is formed of a resin composition containing: a polypropylene-based resin as a component (a); and the component (B) as an optional component, and
a weight ratio of the component (B)/[the component (a)+the component (B)] is 0 to 10 wt %.

14 Claims, 3 Drawing Sheets

(56) References Cited

FOREIGN PATENT DOCUMENTS

| | | | |
|---|---|---|---|
| JP | 2017186561 | 10/2017 | |
| JP | 2019155703 | 9/2019 | |
| JP | 2018095698 | 3/2021 | |
| WO | WO-2020075755 A1 * | 4/2020 | ......... B29C 48/0018 |
| WO | 2020075755 A1 | 9/2021 | |

OTHER PUBLICATIONS

Canadian Requisition by the Examiner for Canadian Application No. 3, 198,293, dated Dec. 4, 2023, 5 pages.
Chinese First Office Action for Chinese Application No. 202180075295.7, dated Jan. 13, 2024, 9 pages with translation.

* cited by examiner

POLYPROPYLENE MULTILAYER SHEET

TECHNICAL FIELD

The present invention relates to a polypropylene multilayer sheet.

BACKGROUND ART

Oriented polypropylene films are used in the fields that require excellent transparency and mechanical properties as well as high heat resistance, and various techniques for further improving these properties have been studied. For example, PTL 1 discloses that a sheet extremely excellent in balance among rigidity, transparency, heat resistance, uniform stretchability, low-temperature impact properties, and easiness of thermoformability is obtained from a polypropylene composition having a molecular weight distribution and the like in a specific range and a content of a comonomer and a crystal nucleating agent in a specific range. In addition, PTL 2 discloses a sheet made of a polymer nano-oriented crystal material containing, as a main component, polymer nano-oriented crystals which have a crystal size on the order of nanometers and highly oriented polymer chains, and which are obtained by cooling and crystallizing a polymer melt while being maintained in an oriented melt state.

Since these sheets are thin, the application of these sheets is limited, and when the thickness of the sheets can be increased, expansion of their use to another application can be expected. In this regard, PTL 3 discloses that a multilayer sheet having excellent transparency and mechanical properties in addition to high heat resistance, and having a thickness of 0.5 to 5 mm is produced by alternately laminating biaxially oriented polypropylene films having different melting points.

CITATION LIST

Patent Literature

PTL 1: JP 2018-095698 A
PTL 2: JP 2012-096526 A
PTL 3: International Publication No. WO 2020/075755

SUMMARY OF INVENTION

Technical Problem

The multilayer sheet described in PTL 3 has excellent rigidity, but the inventors have obtained an idea that, when the rigidity of the multilayer sheet can be further enhanced, the application of polypropylene can be further expanded. In view of such circumstances, an object of the present invention is to provide a polypropylene multilayer sheet having high rigidity.

Solution to Problem

The present inventors have found that a polypropylene multilayer sheet in which two types of biaxially oriented polymer layers having different contents of an inorganic filler are alternately laminated solves the above-described problems, and have completed the present invention. That is, the above-described problems can be solved by the present invention below.

(1) A polypropylene multilayer sheet comprising:
a biaxially oriented polypropylene layer F having a melting point TmF; and
a biaxially oriented polypropylene layer N having a melting point TmN,
the biaxially oriented polypropylene layer N and the biaxially oriented polypropylene layer F being alternately laminated,
the polypropylene multilayer sheet having a thickness of 0.15 to 3.0 mm, wherein $TmF > TmN$, a total number of layers is 3 to 11,
the biaxially oriented polypropylene layer F is formed of a resin composition containing: a polypropylene-based resin as a component (A); and an inorganic filler as a component (B),
a weight ratio of the component (B)/[the component (A)+the component (B)] is 0.5 to 60 wt %,
the biaxially oriented polypropylene layer N is formed of a resin composition containing: a polypropylene-based resin as a component (a); and the component (B) as an optional component, and
a weight ratio of the component (B)/[the component (a)+the component (B)] is 0 to 10 wt %.
(2) The polypropylene multilayer sheet according to (1), in which
the component (A) is a polypropylene-based resin including a component (A1) and an optional component (A2),
the component (A1) is 100 to 60 wt % of a propylene (co)polymer containing 0 to 1 wt % of a comonomer-derived unit selected from C2 to C10 α-olefins (excluding C3 α-olefins),
the component (A2) is 0 to 40 wt % of an ethylene-α-olefin copolymer containing 10 to 90 wt % of an ethylene-derived unit, and
the component (A) has a melt flow rate (MFR) (230° C., load 2.16 kg) of 0.1 to 15 g/10 min.
(3) The polypropylene multilayer sheet according to (1) or (2), in which the component (a) is selected from a propylene homopolymer; a propylene random copolymer containing 5 wt % or less of at least one comonomer selected from C2 to C10 α-olefins (excluding C3 α-olefins); or a combination thereof.
(4) The polypropylene multilayer sheet according to any one of (1) to (3), in which
the polypropylene multilayer sheet includes a coextruded layer in which the biaxially oriented polypropylene layer F and the biaxially oriented polypropylene layer N are coextruded as alternately laminated, and
the coextruded layer has a thickness of 0.08 to 0.50 mm, and a total number of the coextruded layers is 2 to 6.
(5) The polypropylene multilayer sheet according to any one of (1) to (4), in which a ratio DF/DN of a total thickness DF of the biaxially oriented polypropylene layer F to a total thickness DN of the biaxially oriented polypropylene layer N is 1 to 30.
(6) The polypropylene multilayer sheet according to any one of (1) to (5), in which the inorganic filler is a plate-like inorganic filler.
(7) The polypropylene multilayer sheet according to (6), in which the plate-like inorganic filler is talc.
(8) The polypropylene multilayer sheet according to any one of (1) to (7), in which a weight ratio of the component (B)/[the component (A)+the component (B)] in the biaxially oriented polypropylene layer F is 20 to 55 wt %.

(9) A method for producing the polypropylene multilayer sheet according to any one of (1) to (8), the method comprising:

a step 1 of preparing a precursor in which a layer F having a melting point TmF, and a layer N having a melting point TmN are laminated such that the layers F are not adjacent to each other; and a step 2 of bringing a heating element into contact with an outermost layer of the precursor to thermally fusion bond interlayers of the polypropylene multilayer sheet, in which TmF>TmN.

(10) The production method according to (9), wherein a melting point $Tm_{out}$ of the outermost layer and a temperature T of the heating element satisfy the following condition:

$Tm_{out}-T \geq 4(° C.)$ where the melting point is measured by a differential scanning calorimeter (DSC) under condition of a heating rate of 10° C./min from 30° C. to 230° C.

(11) The production method according to (9) or (10), in which the step 1 includes a step of coextruding a raw material of the layer F and a raw material of the layer N to prepare a coextruded original sheet having a plurality of layers, and preparing the precursor using a product obtained by biaxially stretching the coextruded original sheet.

(12) A formed article obtained by forming the polypropylene multilayer sheet according to any one of (1) to (8).

(13) The formed article according to (12), which is a container.

(14) A precursor of the polypropylene multilayer sheet according to any one of (1) to (8), in which a biaxially oriented polypropylene layer F having a melting point TmF, and a biaxially oriented polypropylene layer N having a melting point TmN are laminated such that the biaxially oriented polypropylene layers F are not adjacent to each other, and the precursor has one or more interfaces that are not fusion bonded.

(15) A polypropylene multilayer sheet produced by the method according to any one of (9) to (11).

Advantageous Effects of Invention

According to the present invention, a polypropylene multilayer sheet having high rigidity can be provided.

DESCRIPTION OF EMBODIMENTS

Hereinafter, the present invention will be described in detail. In the present invention, "X to Y" includes its end values, that is, X and Y. In the present invention, a sheet and a film are used synonymously, and in particular, a film-like part having a thickness of 150 μm or more may be referred to as a sheet, and a film-like part having a thickness of less than 150 μm may be referred to as a film. In addition, the sheet and the film may be collectively referred to as "sheet-like part".

1. Polypropylene Multilayer Sheet (1) Thickness

The thickness of the polypropylene multilayer sheet of the present invention (hereinafter also simply referred to as "multilayer sheet") is 0.15 to 3.0 mm. The lower limit of the thickness is preferably 0.18 mm or more, and more preferably 0.20 mm or more. The upper limit of the thickness is preferably 1.5 mm or less, more preferably 1.0 mm or less, and even more preferably 0.80 mm or less. The thickness of the multilayer sheet is appropriately adjusted depending on the application.

(2) Multilayer Structure

The multilayer sheet of the present invention has a multilayer structure in which a biaxially oriented polypropylene layer F and a biaxially oriented polypropylene layer N are alternately laminated. Hereinafter, the biaxially oriented polypropylene layer F is also referred to as "filler layer F", and the biaxially oriented polypropylene layer N is also referred to as "neat layer N". Since between the respective layers are fusion bonded., the multilayer sheet of the present invention is an integrated sheet. Whether between the respective layers of the sheet are fusion bonded and integrated can be confirmed by cross-sectional observation with a polarization optical microscope, as described in PTL 3.

Figure 1:
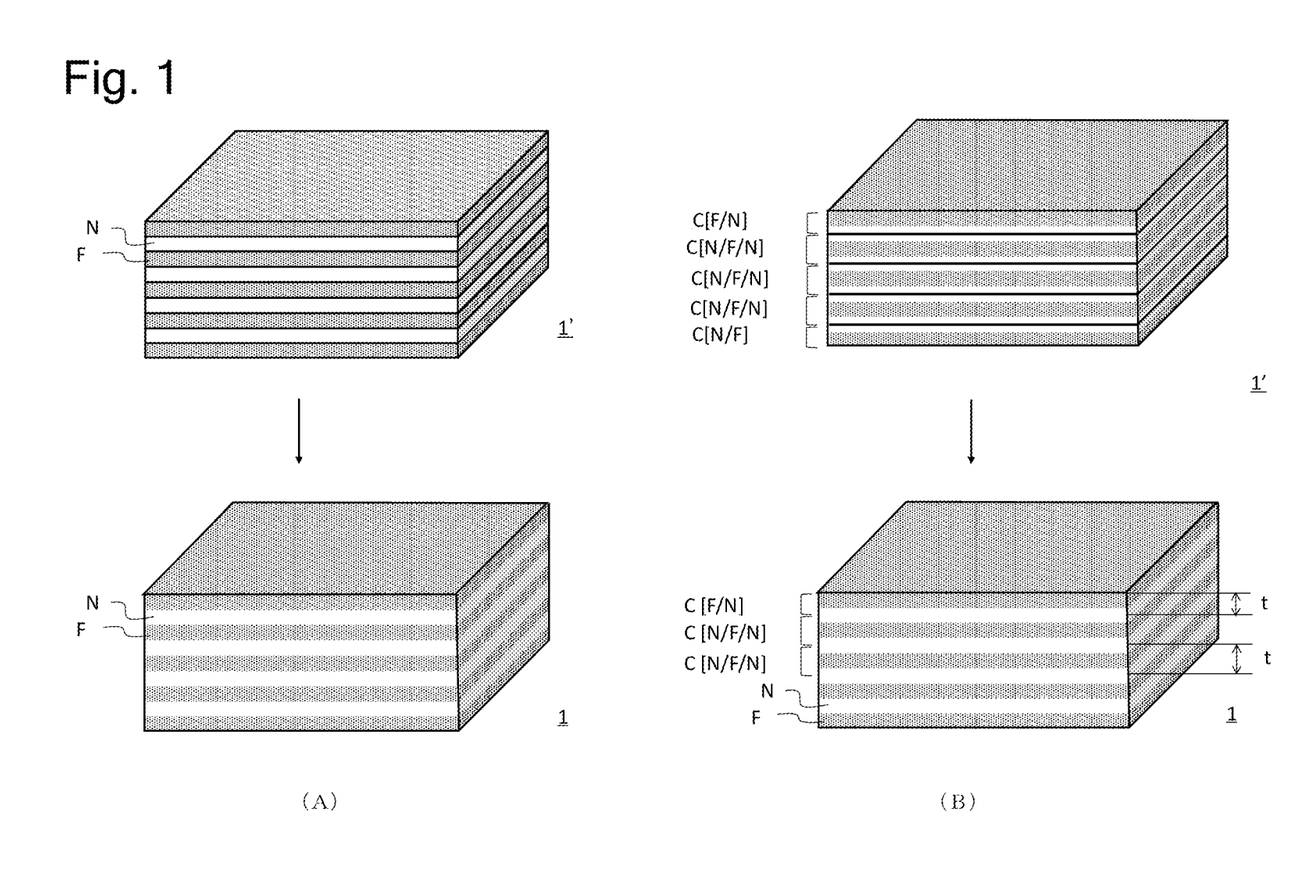
FIG. 1 illustrates a view for describing an outline of a polypropylene multilayer sheet of the present invention.

As described later, the filler layer F in the multilayer sheet of the present invention is derived from a polypropylene biaxially oriented sheet-like part for the filler layer F, and the neat layer N is derived from a biaxially oriented polypropylene sheet-like part for the neat layer N. Each layer may be independently composed of the sheet-like part. This aspect is illustrated in FIG. 1A. In the drawing, the reference alphanumeric 1' denotes a precursor to be described later, the reference alphanumeric F denotes the filler layer F, and the reference alphanumeric N denotes the neat layer N, and the reference alphanumeric 1 denotes the multilayer sheet. The interlayers of the precursor 1' are fusion bonded to form a multilayer sheet 1 of the present invention.

At least a part of all the layers may be composed of coextruded layers which are obtained by coextrusion, and in which the filler layers F and the neat layers N are alternately laminated. This aspect is illustrated in FIG. 1B. In the drawing, the reference alphanumeric C denotes a coextruded layer, and for example, C [F/N] denotes a coextruded layer having two layers of the filler layer F and the neat layer N. The multilayer sheet 1 of the present invention is formed from the precursor 1' having three coextruded layers C[N/F/N] between coextruded layers C[F/N] and C[N/F].

The total number of layers in the multilayer sheet of the present invention is 3 to 11. When the total number of layers is within this range, the multilayer sheet of the present invention exhibits excellent formability, that is, has excellent formability when formed into an article. In the aspect of FIG. 1B, the total number of layers in the multilayer sheet is 9. In an aspect including coextruded layers, the thickness of the coextruded layer is preferably 0.08 to 0.50 mm. The total number of coextruded layers is preferably 2 to 6, more preferably 2 to 5, even more preferably 2 to 4, and particularly preferably 2 to 3. The thickness of the coextruded layer refers to the thickness of the entire coextruded layer C (denoted by tin FIG. 1B). In the case of FIG. 1B, the total number of coextruded layers is 5.

When the value of the ratio DF/DN of the total thickness (sum of the thicknesses), DF of the filler layers F to DN of the neat layers N, is excessively small, the rigidity of the multilayer sheet is insufficient, and when the value is excessively large, the fusion bonding properties between layers of the multilayer sheet are insufficient. For the balance between fusion bonding properties and rigidity, the ratio DF/DN is preferably 1 to 30, more preferably 1 to 25, and even more preferably 4 to 15. The thickness of each layer may be the same or different. The thickness of each layer is appropriately adjusted so that the ratio falls within the above range. The thickness of one layer of the filler layer F is preferably 50 μm to 200 μm. The thickness of one layer of the neat layer N is preferably 5 μm to 200 μm.

The melting point TmF of the filler layer F and the melting point TmN of the neat layer N satisfy the relationship TmF>TmN. The value of TmF−TmN is not limited, but is preferably 1° C. or higher, more preferably 10° C. or higher, and even more preferably 25° C. or higher. The value TmF−TmN is preferably 60° C. or lower. When these melting points are excessively low, the rigidity and heat resistance of the multilayer sheet are insufficient. From this viewpoint, the melting point TmF is preferably 160° C. or higher, more preferably 165° C. or higher, and the melting point TmN is preferably 100° C. or higher, more preferably 120° C. or higher, and even more preferably 130° C. or higher. These melting points can be measured by DSC under the condition of a heating rate of 10° C./min from 30° C. to 230° C.

(3) Mechanical Properties and Heat Resistance

The multilayer sheet of the present invention, and a formed article such as a container obtained from the multilayer sheet of the present invention have excellent mechanical properties. For example, the sheet and the formed article have a tensile modulus (JIS K7161-2) of preferably 3,000 MPa or more, more preferably 3,500 MPa or more, and even more preferably 4,000 MPa or more, as rigidity. The multilayer sheet of the present invention is also excellent in cold impact resistance. For example, the multilayer sheet and the formed article of the present invention preferably have an in-plane impact strength (−30° C., JIS K7211-2) of 4.0 J or more, more preferably 5.0 J or more, and even more preferably 7.0 J or more.

The container obtained from the multilayer sheet of the present invention is excellent in heat resistance, and thus can be used at a wide range of temperatures. In particular, the heat-resistant temperature in the buckling test of the container is preferably 120° C. or higher, more preferably 130° C. or higher, even more preferably 140° C. or higher, and particularly preferably 150° C. or higher. A container having a heat-resistant temperature in this range in the buckling test has excellent applicability to a microwave oven. The buckling test is performed in the following steps.

1) A container is placed on a plate made of metal or the like having high heat resistance so that the opening of the container faces downward, and then the container is maintained for 1 hour while being heated in an oven in state in which no load is applied.
2) After opening the oven door, a load (640 g) is immediately placed on the container, and the load is removed after 10 seconds.
3) The plate and the container are taken out from the oven, and the presence or absence of buckling of the container is visually checked.
4) The temperature at which the container starts to buckle is defined as a heat-resistant temperature.

(4) Surface

A functional group can be applied to the surface of the multilayer sheet of the present invention. As the functional group, an oxygen-containing functional group is preferred. Examples of the oxygen-containing functional group include a carboxyl group, a carboxylate group, an acid anhydride group, a hydroxy group, an aldehyde group, and an epoxy group. These functional groups enhance adhesion between the multilayer sheet of the present invention and other materials.

(5) Respective Layers

1) Filler Layer F

The filler layer F is formed of a resin composition containing a component polypropylene-based resin (A) and an inorganic filler (B).

[Polypropylene-Based Resin (Component (A))]

The polypropylene-based resin is a resin containing polypropylene as a main component. The polypropylene-based resin constituting the filler layer F contains 100 to 60 wt % of a component (A1) and 0 to 40 wt % of an optional component (A2). When the component (A2) is more than 0 wt %, the component (A) may be a so-called heterophasic copolymer (HECO) obtained by polymerizing the component (A1) and polymerizing the component (A2) in the presence of the component (A1), or may be a blend of the component (A1) and the component (A2), which are separately prepared by polymerization, but is preferably a HECO in that the component (A) can be obtained by fewer production steps.

The component (A1) is a propylene (co)polymer containing 0 to 1 wt % of a comonomer-derived unit selected from C2 to C10 α-olefins (excluding C3 α-olefins). In the present invention, the comonomers selected from C2 to C10 α-olefins naturally contain no C3 α-olefins. When the component (A1) contains a comonomer, ethylene is preferable from the viewpoint of economic efficiency. When the amount of the comonomer-derived unit exceeds the upper limit, the rigidity of the multilayer sheet may be reduced. From this viewpoint, it is preferable that the component (A1) contain no comonomer-derived unit, that is, the component (A1) be a propylene homopolymer. Alternatively, when the component (A1) contains a comonomer-derived unit, the amount thereof is preferably more than 0 wt % and 0.5 wt % or less.

In the polypropylene-based resin, the content of the component (A1) is 60 to 100 wt %. When the content of the component (A1) is small, it may be difficult to produce a polypropylene-based resin. Thus, the content of the component (A1) is preferably 70 to 100 wt %, and more preferably 75 to 100 wt %.

The melt flow rate (MFR) (230° C., load 2.16 kg) of the component (A) is 0.1 to 15 g/10 min. When the MFR exceeds the upper limit, it is difficult to prepare a biaxially oriented polypropylene sheet-like part as a raw material of the multilayer sheet, and when the MFR is less than the lower limit, it is difficult to produce the component (A). From this viewpoint, the lower limit of the MFR is preferably 1 g/10 min or more and more preferably 2 g/10 min or more, and the upper limit thereof is preferably 10 g/10 min or less and more preferably 8 g/10 min or less.

The optional component (A2) is an ethylene-α-olefin copolymer containing 10 to 90 wt % of an ethylene-derived unit. When the ethylene-derived unit is less than the lower limit or more than the upper limit, the cold impact resistance is reduced. From this viewpoint, the content of the ethylene-derived unit is preferably 15 to 85 wt %, and more preferably 20 to 80 wt %. The α-olefin is not limited as long as it is other than ethylene, but is preferably propylene, 1-butene, 1-hexene, or 1-octene, more preferably propylene or 1-butene, and even more preferably propylene.

In the polypropylene-based resin, the content of the component (A2) is 0 to 40 wt %. When the content of the component (A2) is excessively large, it may be difficult to produce a polypropylene-based resin. Thus, the content of the component (A2) is preferably 0 to 35 wt %, and more preferably 0 to 30 wt %.

[Inorganic Filler (Component (B))]

The inorganic filler is added mainly for improving the rigidity of the material. Examples of the inorganic filler include the following materials from the viewpoint of the substance:

natural silicic acid or silicate such as talc, kaolinite, clay, pyrophyllite, selenite, wollastonite, or mica; synthetic silicic acid or silicate such as hydrous calcium silicate, hydrous aluminum silicate, hydrous silicic acid, or anhydrous silicic acid; a carbonate such as precipitated calcium carbonate, ground calcium carbonate, or magnesium carbonate; a hydroxide such as aluminum hydroxide or magnesium hydroxide; and an oxide such as zinc oxide or magnesium oxide.

In addition, examples of the inorganic filler include the following materials from the viewpoint of the shape:

a powder filler including synthetic silicic acid, silicate or the like, such as hydrous calcium silicate, hydrous aluminum silicate, hydrous silicic acid, or anhydrous silicic acid; a plate-like filler such as talc, kaolinite, clay, or mica; a whisker-like filler such as basic magnesium sulfate whisker, calcium titanate whisker, aluminum borate whisker, sepiolite, processed mineral filler (PMF), xonotlite, potassium titanate, or ellestadite; a balloon-like filler such as glass balloon or fly ash balloon; and a fibrous filler such as glass fiber.

One type of the inorganic filler may be used, or two or more types thereof may be used in combination. In order to improve the dispersibility of these fillers, the surface treatment of the inorganic filler may be performed as necessary. The inorganic filler used in the present invention is not limited, but a plate-like inorganic filler is preferable from the viewpoint of enhancing rigidity and impact resistance by promoting the orientation of the polypropylene crystal in the filler layer F in the direction along the sheet surface. As the plate-like inorganic filler, a known material such as talc, kaolinite, clay, or mica can be used, but in consideration of affinity with the polypropylene-based resin, ease of procurement as a raw material, economic efficiency, and the like, talc or mica is preferable, and talc is more preferable. The volume average particle size of the plate-like inorganic filler is preferably 1 to 10 μm, and more preferably 2 to 7 μm. When the volume average particle size is less than the lower limit, the rigidity of the filler layer F may be reduced. When the volume average particle size exceeds the upper limit, breakage tends to occur during stretching, thus making it difficult to prepare a biaxially oriented sheet-like part as a raw material of the multilayer sheet. The volume average particle size can be measured as a 50% diameter in a volume-based integrated fraction by a laser diffraction method (based on JIS R1629).

[Weight Ratio Between Component (A) and Component (B)]

The weight ratio between the component (A) and the component (B) in the filler layer F is as follows.

Component$(B)$/[component$(A)$+component$(B)$]=0.5 to 60 wt %

When the amount of the component (B) is small, the rigidity of the multilayer sheet is insufficient, and when the amount of the component (B) is large, it may be difficult to produce the multilayer sheet. From this viewpoint, the weight ratio is preferably 5 to 55 wt %, more preferably 10 to 55 wt %, and even more preferably 20 to 55 wt %.

2) Neat Layer N

The neat layer N is formed of a resin composition containing a polypropylene-based resin as a component (a) and the component (B) as an optional component. The component (a) is selected so as to satisfy the relationship between TmF and TmN. The component (a) is preferably a propylene homopolymer (HOMO); a propylene random copolymer (RACO) containing 5 wt % or less of at least one comonomer selected from C2 to C10 α-olefins (excluding C3 α-olefins); or a combination of these HOMO and RACO. When the amount of the comonomer-derived unit is excessively small, the fusion bonding properties with the layer F may be insufficient, and when the amount of the comonomer-derived unit is excessively large, the rigidity of the multilayer sheet may be reduced. From this viewpoint, the amount of the comonomer-derived unit is preferably more than 0 wt % and 4.5 wt % or less. The comonomer is preferably ethylene (C2 α-olefin).

The MFR (230° C., load 2.16 kg) of the polymer or resin composition constituting the neat layer N is preferably 1 to 15 g/10 min, more preferably 2 to 10 g/10 min, and even more preferably 3 to 8 g/10 min. When the MFR is excessively small, it is difficult to produce a polypropylene-based resin as a raw material, and when the MFR is excessively large, breakage occurs during biaxial stretching, and the multilayer sheet may not be stably produced.

[Weight Ratio Between Component (a) and Component (B)]

The weight ratio between the component (a) and the component (B) in the neat layer N is as follows.

Component$(B)$/[component$(a)$+component$(B)$]=0 to 10 wt %

In particular, in the case of including a step of preparing an original sheet by coextrusion in the production of the multilayer sheet, when the amount of the component (B) in the original sheet N″ (corresponding to the neat layer N of the multilayer sheet) is large, stretching of the original sheet is difficult. Thus, the weight ratio is preferably 5 wt % or less. The weight ratio is more preferably less than 5 wt %, even more preferably 1 wt % or less, particularly preferably 0.5 wt % or less, and most preferably 0 wt %. The weight ratio in the neat layer N is smaller than the weight ratio in the filler layer F.

(6) Nucleating Agent

The layer F or the layer N may be formed of a resin composition containing a nucleating agent, or may be formed of a resin composition or polymer containing no nucleating agent. The nucleating agent is an additive used for increasing crystalline components in resin to increase rigidity. A known additive can be used as such an additive. The amount of the nucleating agent is preferably 1 part by weight or less based on 100 parts by weight of the polymer from the economic viewpoint.

(7) Other Additives

The resin composition constituting the filler layer F and the neat layer N may contain commonly used additives that are normally used for polyolefins, such as antioxidants, chlorine absorbers, heat-resistant stabilizers, light stabilizers, ultraviolet absorbers, internal lubricants, external lubricants, anti-blocking agents, anti-static agents, anti-fogging agents, flame retardants, dispersants, copper corrosion inhibitors, neutralizing agents, plasticizers, crosslinking agents, peroxides, and extension oils, organic pigments, and inorganic pigments. The amount of the additive to be added may be a publicly known amount. Further, the resin composition may also contain synthetic resins or synthetic rubbers other than polypropylene, as long as the effect of the present invention is not impaired. One type of synthetic resin or synthetic rubber may be used, or two or more types thereof may be used.

(8) Precursor

As described later, the multilayer sheet of the present invention is preferably produced through a precursor in which the filler layer F and the neat layer N are laminated such that the layers F are not adjacent to each other, and which has one or more interfaces that are not fusion bonded. The interlayers of the precursor are fusion bonded to form the multilayer sheet of the present invention. Further, the precursor is formed into a desired shape and the layers thereof are fusion bonded at the same time, so that the precursor is directly formed into an article. Some of the layers constituting the precursor may be composed of the coextruded layer described above. Therefore, in the precursor, all of the interfaces are separated in one aspect, and one or more of the interfaces are fusion bonded and one or more of the interfaces are separated in another aspect. The fusion bonding between layers in the later aspect is caused by coextrusion, and is not caused by thermocompression bonding described later.

2. Application

The multilayer sheet of the present invention has a high degree of orientation in the in-plane direction and a specific high-order structure as well as exhibits less dependency of the degree of orientation in the thickness direction. Thus, the multilayer sheet of the present invention has excellent mechanical properties while being lightweight. Therefore, the multilayer sheet of the present invention is useful as food packaging materials, containers, lids, or the like that are thinner and lighter than before. Further, the multilayer sheet of the present invention has high rigidity, and thus is useful as sundries, daily necessities, household electric appliance parts, toy parts, furniture parts, building parts, packaging components, industrial materials, distribution materials, agricultural materials, or the like. Moreover, the multilayer sheet of the present invention can also be used for automobile parts, electrical/electronic parts, outer case parts, or the like as a substitute for a steel plate.

In particular, the multilayer sheet of the present invention has excellent formability, and thus is useful as food packaging materials, containers, or the like. The container or the like is thin and lightweight, and has a wide operating temperature range.

3. Production Method

The multilayer sheet of the present invention is preferably produced by a method including: a step 1 of preparing a precursor in which the filler layer F and the neat layer N are laminated such that the filler layers F are not adjacent to each other; and a step 2 of bringing a heating element into contact with an outermost layer of the precursor to thermally fusion bond layers of the sheet. The melting point TmF of the filler layer F and the melting point TmN of the neat layer N satisfy the relationship TmF>TmN, and preferably satisfy the relationship TmF−TmN≥1 (° C.). The difference in melting point improves adhesion between layers. Hereinafter, respective steps will be described with reference to FIGS. 2 and 3. In the drawing, the reference alphanumerics f and n denote resin compositions that finally constitute the layer F and the layer N. The referencealphanumerics F″ and N″ denote un-oriented sheets (original sheets) that finally constitute the layer F and the layer N. The reference alphanumerics F′ and N′ denote biaxially oriented sheet-like parts that finally constitute the layer F and the layer N. The reference alphanumeric 1′ denotes a precursor, the reference alphanumeric 1 denotes a multilayer sheet, the reference alphanumeric F denotes a filler layer, and the reference alphanumeric N denotes a neat layer. In addition, the reference alphanumeric 2 denotes an un-oriented sheet preparation step, the reference alphanumeric 3 denotes a stretching step, the reference alphanumeric 4 denotes a lamination step, and the reference alphanumeric 5 denotes an interface fusion bonding step. The melting points Tmf and Tmn of the resin compositions, the melting points TmF″ and TmN″ of the un-oriented sheets, the melting points TmF′ and TmN′ of the biaxially oriented sheet-like parts, and the melting points TmF and TmN of the layers have the following relationships.

$$Tmf=TmF''$$

$$TmF'=TmF=Tmf+x(° C.)$$

$$Tmn=TmN''$$

$$TmN'=TmN=Tmn+y(° C.)$$

x and y vary depending on the oriented state or the like, but are each independently preferably 1 to 10° C., and more preferably approximately 2 to 7° C.

(1) Step 1

In this step, the precursor is prepared. Some of the layers constituting the precursor may be composed of the coextruded layer described above. All of the interfaces of the precursor are not fusion bonded, or some of the interfaces are fusion bonded.

This step can be performed, for example, by separately preparing a biaxially oriented polypropylene sheet-like part F′ for the filler layer F and a biaxially oriented polypropylene sheet-like part N′ for the neat layer N, and alternately laminating these parts. For example, the precursor 1′ can be prepared by laminating F′/N′/ . . . /F′. In this case, all of the interfaces are preferably not fusion bonded. Both outermost layers are preferably F′ from the viewpoint of enhancing the heat resistance of the resulting multilayer sheet.

Figure 2:
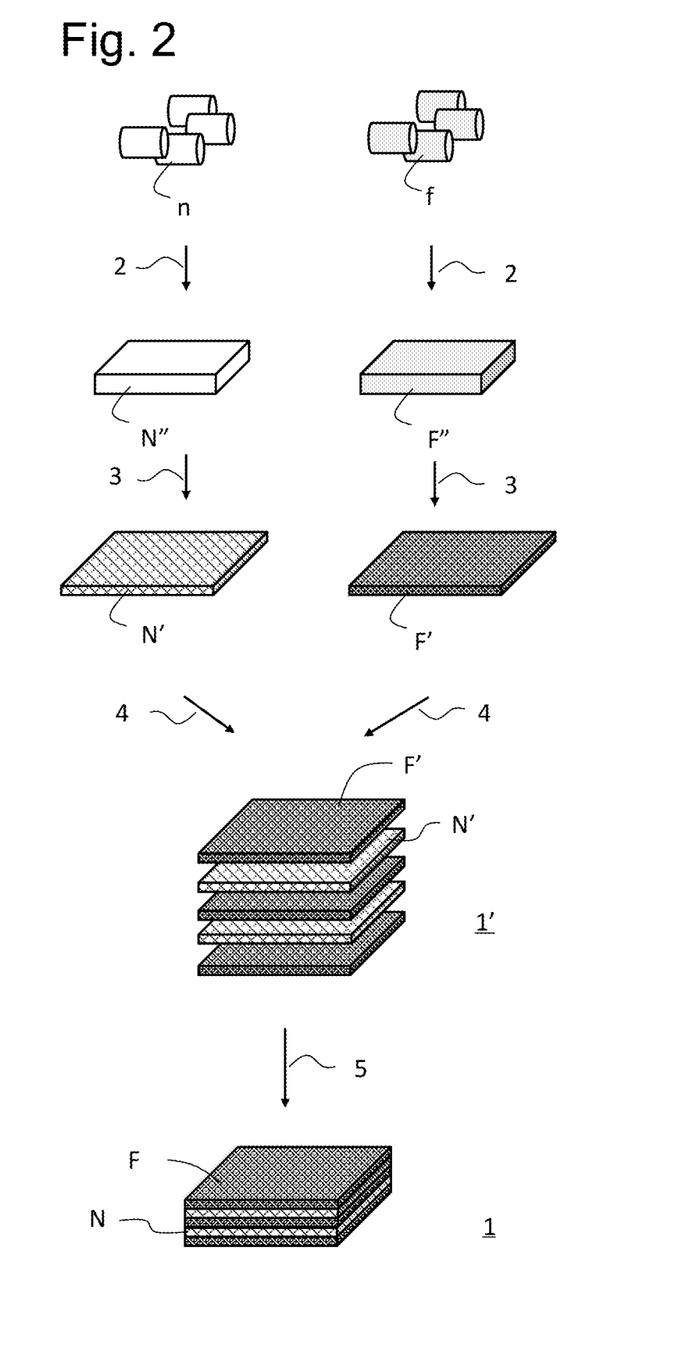
FIG. 2 illustrates a view for describing one aspect of a method for producing a polypropylene multilayer sheet of the present invention.

One aspect of this step is illustrated in FIG. 2. In the present aspect, the biaxially oriented polypropylene sheet-like parts F′ and N′ are separately prepared, and the biaxially oriented polypropylene sheet-like parts F′ and N′ are alternately laminated to prepare the precursor 1′. In this case, all of the interfaces are preferably not fusion bonded, but one or some of the interfaces may be fusion bonded. Both outermost layers are preferably biaxially oriented polypropylene sheet-like parts F′ from the viewpoint of enhancing the heat resistance of the resulting sheet.

The biaxially oriented polypropylene sheet-like part N′ can be prepared by a known method. The biaxially oriented polypropylene sheet-like part N′ can be obtained by, for example, preparing an original sheet (un-oriented polypropylene sheet-like part N″) from a raw material resin composition n, and biaxially stretching the original sheet by a known method. The thickness of the original sheet is preferably more than 0.15 mm, and the upper limit thereof is not limited, but is preferably 6 mm or less from the viewpoint of ease of handling and the like. The temperature during biaxial stretching is not limited, but is preferably in a range of TmN″−10° C. to TmN″.

The biaxially oriented polypropylene sheet-like part F' can also be produced in the same manner as the biaxially oriented polypropylene sheet-like part N'. However, the temperature V during biaxial stretching is preferably set so as to satisfy the following relationship because the biaxially oriented polypropylene sheet-like part F' contains a relatively large amount of the inorganic filler.

$$-3 \leq V-TmF'' \leq 3$$

TmF" is the melting point (° C.) of the original sheet. The melting point Tmf of the resin composition is measured by DSC under the condition of a heating rate of 10° C./min from 30° C. to 230° C., and the melting point TmF" can be determined from the relationship Tmf=TmF".

The thickness of the original sheet is preferably more than 0.15 mm, and the upper limit thereof is not limited, but is preferably 6 mm or less from the viewpoint of ease of handling and the like. The stretch ratio is preferably 4 to 6 times for one axis from the viewpoint of rigidity. The ratio for one axis and the ratio for the other axis may be the same or different. The two axes are preferably orthogonal.

Figure 3:
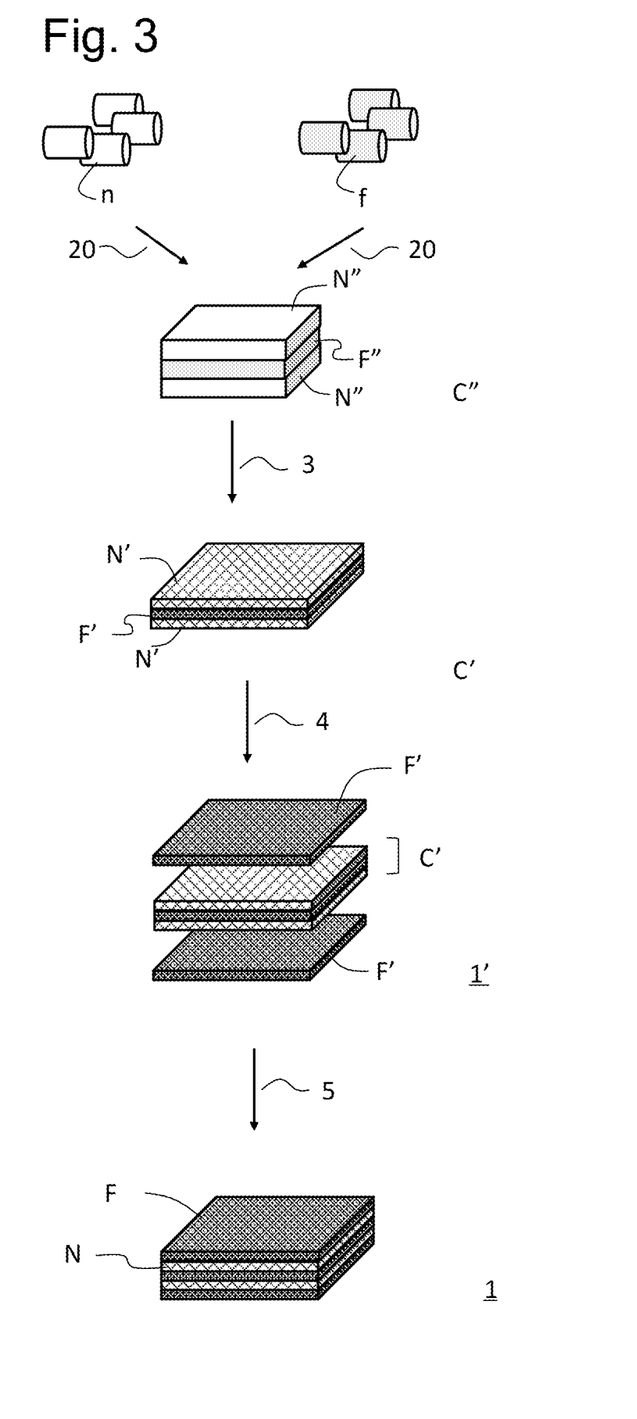
FIG. 3 illustrates a view for describing another aspect of the method for producing a polypropylene multilayer sheet of the present invention.

This step is preferably performed using a coextruded sheet-like part having the layer F and the layer N. Use of such a coextruded sheet-like part allows the step 2 to be simplified. This aspect is illustrated in FIG. 3. Specifically, a coextruded biaxially oriented sheet-like part C' is prepared by coextruding a raw material of the layer F and a raw material of the layer N to prepare a coextruded original sheet C" having a plurality of layers, and biaxially stretching the coextruded original sheet C". The temperature V at the time of biaxially stretching the coextruded original sheet C" is preferably selected so as to satisfy the above-described relationship. Subsequently, the two coextruded biaxially oriented sheet-like parts C', or the coextruded biaxially oriented sheet-like part C' and the above-described biaxially oriented sheet-like part F' or N' are laminated to prepare the precursor 1'. In this case, the total number of coextruded layers in the precursor 1' is not limited, but is preferably 2 to 6. The thickness of the coextruded biaxially oriented sheet-like part C' is preferably 0.08 to 0.50 mm, and more preferably 0.10 to 0.50 mm.

As illustrated in FIG. 3, a precursor is prepared from the coextruded biaxially oriented sheet-like part C', the biaxially oriented sheet-like part F', and the biaxially oriented sheet-like part N', and then a multilayer sheet can be produced from the precursor.

Precursor: F'/C'[N/F/N]/F'
Multilayer sheet: F/N/F/N/F

In the precursor, the respective interfaces between the layers F' and C' are not fusion bonded.

In the following precursor, the interface between the N layers at the center is fusion bonded, and a three-layer multilayer sheet is obtained from the precursor.

Precursor: C'[F/N]/C'[N/F]
Multilayer sheet: F/N/F

Alternatively, in a precursor including a coextruded three-layer biaxially oriented sheet-like part, two interfaces between the N layers at the center are fusion bonded, and a five-layer multilayer sheet is obtained from the precursor.

Precursor: C'[F/N]/C'[N/F/N]/C'[N/F]
Multilayer sheet: F/N/F/N/F

Each of the single-layer biaxially oriented sheet-like part and the coextruded biaxially oriented sheet-like part can be disposed in any direction. The orientation direction in-plane of the multilayer sheet can be adjusted depending on the disposition of the parts.

(2) Step 2

In this step (reference alphanumeric 5 in FIGS. 2 and 3), a heating element is brought into contact with the outermost layers of the precursor 1' of the multilayer sheet to thermally fusion bond the respective layers. The melting point $Tm_{out}$ of the outermost layer and the temperature T of the heating element preferably satisfy the relationship $Tm_{out}-T \geq 4(° C.)$. By satisfying the relationship, the layers can be favorably fusion bonded. The temperature difference is more preferably 6° C. or higher from this point of view. The upper limit of the temperature difference is not limited, but is preferably 40° C. or lower, and more preferably 30° C. or lower from the viewpoint of production with polypropylene. T can be measured by any method, but is preferably measured by using a non-contact type thermometer such as a radiation thermometer. $Tm_{out}$ corresponds to the melting point of the layer disposed as the outermost layer. The melting point is defined as the peak temperature of the melting curve obtained through measurement by DSC under the condition of a heating rate of 10° C./min from 30° C. to 230° C.

The temperature T preferably satisfies the relationship $TmF \geq T \geq TmN$, and more preferably satisfies the relationship $TmF \geq T \geq TmN+10$ (° C.). When T exceeds the upper limit, the laminate is melted, and mechanical properties may be deteriorated. When T is less than the lower limit, the layers are not sufficiently fusion bonded, and mechanical properties may be deteriorated. The specific temperature of the heating element is preferably approximately 120 to 190° C., more preferably 140 to 170° C., and even more preferably 150 to 165° C.

Preferably, this step is successively performed using a heating roll as the heating element. Specifically, the layers are fusion bonded by passing the precursor of the multilayer sheet between two heated rolls. A heating roll including two or more pairs of rolls, each pair being composed of two rolls, is used as the heating element for fusion bonding. The pressure to be applied at that time is appropriately adjusted. The take-up speed in the roll forming is not limited, but is preferably approximately 0.05 to 10 m/min.

Examples of the method other than the roll forming include press-bond molding and fusion bonding molding. In addition, in the thermally fusion bonding the sheet-like parts, a pressure is preferably applied in order to suppress thermal shrinkage and further promote orientation. The pressure at that time is appropriately adjusted according to the fusion bonding temperature. In the step 2, the load to be applied to the laminate is preferably 2.0 MPa or less. When a load exceeding this value is applied, rigidity may be reduced.

(3) Other Steps

The production method of the present invention may further include a publicly known step such as cooling the multilayer sheet obtained in the preceding step. Non-limiting examples of the cooling method include a method of cooling at room temperature or a method of cold-pressing at room temperature or at 10 to 20° C.

Since the multilayer sheet of the present invention has good adhesion between layers, there is almost no discontinuity between the layers. Thus, the multilayer sheet of the present invention can be dealt as an integrated sheet. In the conventional method, provision of a biaxially oriented multilayer sheet having a thickness of 0.20 mm or more has not been industrially realized in view of costs or the like. However, a multilayer sheet that has a thickness of 0.15 mm or more and has orientations of two or more directions can be industrially produced by the present invention.

By performing molding (including forming into a desired shape) on the multilayer sheet of the present invention, by the method according to the purpose, various formed articles can be obtained. Examples of the molding method include known press molding, hot plate molding, stretch molding, roll forming, drawing molding, press-bond molding, fusion bonding molding, vacuum forming, pressure forming, and vacuum-pressure forming. Further, a special film can be bonded to the outermost surface of the multilayer sheet of the present invention for the purpose of decoration, surface modification, or the like. Examples of the film to be bonded include anti-fogging films, low temperature sealing films, adhesive films, printed films, embossed films, and films for retort packaging. The thickness of the film of the outermost surface is not particularly limited, but an excessive thickness of the film may result in deterioration of the properties of the multilayer sheet. Further, special films generally require high cost and are not preferred in economical view. Thus, the film thickness is preferably thin. In the step 2, a special film may be laminated on the surface of the sheet-like part disposed as the outermost layer.

In addition, a coated sheet having a coating film on the sheet can also be obtained by applying coating to the multilayer sheet of the present invention. The type of coating film is not limited, and is not normally limited as long as the coating film is used in the coating field. However, in the present invention, coating films used for coating automobile bodies are preferred. Examples of the preferred coating film include epoxy-based coating films, urethane-based coating films, and polyester-based coating films. A lower layer coating film (primer coating film), a middle layer coating film, or an upper layer coating film (clear coating film) may be provided as necessary. In the case where the multilayer sheet of the present invention is used as a sheet to be coated (coating sheet), the surface to be coated preferably has a functional group.

(4) Application of Functional Group

The method for applying a functional group to the surface of the multilayer sheet of the present invention is not limited. For example, an oxygen-containing functional group can be applied to the surface by subjecting the sheet to plasma treatment or corona treatment. Alternatively, an oxygen-containing functional group can be applied to the surface of the multilayer sheet by preparing a polypropylene film having a functional group, and preparing the precursor in the step 1 so that the functional group-containing film is the outermost layer.

A polypropylene film having an oxygen-containing functional group can be obtained by forming a publicly known polypropylene such as maleic anhydride-modified polypropylene or epoxy-modified polypropylene into a film. The thickness of the functional group-containing film is not limited, but is preferably less than 150 µm. Moreover, the functional group-containing film may or may not be biaxially oriented. In the lamination step, a polypropylene film having a functional group and a polypropylene sheet having no functional group may be simultaneously laminated, or polypropylene sheets having no functional group are laminated to produce a multilayer sheet in advance, and then a polypropylene film having a functional group may be laminated on the surface of the sheet. However, the simultaneous lamination method is preferred in consideration of workability.

EXAMPLES

1. Preparation of Biaxially Oriented Sheet-Like Part

Respective biaxially oriented sheet-like parts formed of resin compositions shown in Table 1 were prepared as follows.

[Polymer 1]

A solid catalyst used for polymerization was prepared by the method described in Example 1 of EP 674991 B. The solid catalyst was a catalyst in which Ti and diisobutyl phthalate as an internal donner were supported on $MgCl_2$ by the method described in the above patent publication. The solid catalyst (1), triethylaluminium (TEAL), and dicyclopentyldimethoxysilane (DCPMS) were brought into contact at −5° C. for 5 minutes in an amount such that the weight ratio of TEAL to the solid catalyst was 11 and the weight ratio of TEAL to DCPMS was 10. The obtained catalyst system was maintained in a liquid propylene in the form of suspension at 20° C. for 5 minutes to carry out prepolymerization. The resulting prepolymerization product was introduced into a polymerization reactor, and hydrogen and propylene were fed to the reactor. Then, a polymer 1 was obtained as a propylene homopolymer by setting the polymerization temperature to 75° C. and the hydrogen concentration to 0.23 mol %, and adjusting the pressure.

[Resin Composition (a)]

To 60 parts by weight of the polymer 1, 40 parts by weight of talc (Neotalc UNI05, available from Neolite Industries (volume average particle size measured by laser diffraction method: 5 µm)), 0.2 parts by weight of an antioxidant (B225, available from BASF), and 0.05 parts by weight of a neutralizing agent (calcium stearate, available from Tannan Kagaku Kogyo Co. Ltd.) were blended, and the blend was mixed with stirring using a Henschel mixer for 1 minute. The mixture was melt-kneaded using a single-screw extruder (NVC φ50 mm, available from Nakatani Machinery Ltd.) at a cylinder temperature of 230° C., and the extruded strand was cooled in water, followed by cutting with a pelletizer to obtain a resin composition (a) in the form of pellet. The resin composition (a) had an MFR (temperature: 230° C., load: 2.16 kg) of 7.0 g/10 min.

[Polymer 2]

The solid catalyst (1), TEAL, and dicyclopentyldimethoxysilane (DCPMS) were brought into contact at −5° C. for 5 minutes in an amount such that the weight ratio of TEAL to the solid catalyst was 11 and the weight ratio of TEAL to DCPMS was 3. The obtained catalyst system was maintained in a liquid propylene in the form of suspension at 20° C. for 5 minutes to carry out prepolymerization. The obtained prepolymerization product was introduced into a polymerization reactor, and then hydrogen, propylene and ethylene were fed to the reactor. Then, a polymer 2 was obtained as a propylene-ethylene copolymer by setting the polymerization temperature to 75° C., the hydrogen concentration to 0.44 mol %, the ethylene concentration to 1.07 mol %, and adjusting the polymerization pressure.

[Resin Composition (b)]

To 100 parts by weight of the polymer 2, 0.2 parts by weight of an antioxidant (B225, available from BASF) and 0.05 parts by weight of a neutralizing agent (calcium stearate, available from Tannan Kagaku Kogyo Co. Ltd.) were blended, and the blend was mixed with stirring using a Henschel mixer for 1 minute. The mixture was melt-kneaded using a single-screw extruder (NVC φ50 mm, available from Nakatani Machinery Ltd.) at a cylinder temperature of 230° C., and the extruded strand was cooled in water, followed by cutting with a pelletizer to obtain a resin composition (b) in the form of pellet. The resin composition (b) contained 4.0 wt % of ethylene-derived unit, and had an MFR (temperature: 230° C., load: 2.16 kg) of 7.5 g/10 min.

[Resin Composition (c)]

To 99.7 parts by weight of the polymer 2, 0.3 parts by weight of the talc, 0.2 parts by weight of an antioxidant (B225, available from BASF), and 0.05 parts by weight of a neutralizing agent (calcium stearate, available from Tannan Kagaku Kogyo Co. Ltd.) were blended, and the blend was mixed with stirring using a Henschel mixer for 1 minute. The mixture was melt-kneaded using a single-screw extruder (NVC φ50 mm, available from Nakatani Machinery Ltd.) at a cylinder temperature of 230° C., and the extruded strand was cooled in water, followed by cutting with a pelletizer to obtain a resin composition (c) in the form of pellet. The resin composition (c) contained 4.0 wt % of ethylene-derived unit, and had an MFR (temperature: 230° C., load: 2.16 kg) of 7.5 g/10 min.

[Polymer 3]

The solid catalyst (1), TEAL, and cyclohexyl methyl dimethoxysilane (CHMMS) were brought into contact at −5° C. for 5 minutes in an amount such that the weight ratio of TEAL to the solid catalyst was 8 and the weight ratio of TEAL to CHMMS was 8. The obtained catalyst system was maintained in a liquid propylene in the form of suspension at 20° C. for 5 minutes to carry out prepolymerization, and the resultant was used as a prepolymerization catalyst.

The obtained prepolymerization catalyst was introduced into a polymerization reactor, propylene was then supplied as a monomer to the reactor. Further, hydrogen as a molecular weight modifier was supplied to the reactor so that the hydrogen concentration in the polymerization reactor was 0.041 mol %. A propylene homopolymer (polymer 3) was obtained by setting the polymerization temperature to 75° C. and adjusting the polymerization pressure.

[Resin Composition (d)]

To 100 parts by weight of the polymer 1, 0.2 parts by weight of an antioxidant (B225, available from BASF) and 0.05 parts by weight of a neutralizing agent (calcium stearate, available from Tannan Kagaku Kogyo Co. Ltd.) were blended, and the blend was mixed with stirring using a Henschel mixer for 1 minute. The mixture was melt-kneaded using a single extruder (NVC φ50 mm, available from Nakatani Machinery Ltd.) at a cylinder temperature of 230° C., and the extruded strand was cooled in water, followed by cutting with a pelletizer to obtain a resin composition (d) in the form of pellet. The resin composition (d) had an MFR (temperature: 230° C., load: 2.16 kg) of 7.0 g/10 min.

[Resin Composition (e)]

To 100 parts by weight of the polymer 3, 0.2 parts by weight of B225 available from BASF, as an antioxidant, 0.05 parts by weight of calcium stearate available from Tannan Kagaku Kogyo Co. Ltd., as a neutralizing agent, and 0.05 parts by weight of a nonitol-based nucleating agent (Millad NX8000J, available from Milliken & Company) were blended, and the blend was mixed with stirring using a Henschel mixer for 1 minute. The mixture was melt-kneaded using an NVC extruder (available from Nakatani Machinery Ltd.) at a cylinder temperature of 230° C., and the extruded strand was cooled in water, followed by cutting with a pelletizer to obtain a resin composition (e) in the form of pellet. The resin composition (e) had an MFR (temperature: 230° C., load: 2.16 kg) of 3.0 g/10 min.

[Biaxially Oriented Sheet A]

Using a three-type three-layer film/sheet forming machine (25 mm φ, available from TPIC Co., Ltd.), an original sheet having a thickness of 3.8 mm (size: 10 cm×10 cm or more) was obtained from the resin composition (a) at an extruding temperature of 230° C. Then, the original sheet was subjected to simultaneous biaxial stretching (5 times×5 times) at 160° C. using a film stretching apparatus (KARO-IV, available from Bruckner) to obtain a biaxially oriented sheet A having a thickness of 0.15 mm.

[Biaxially Oriented Sheet B]

Using a three-type three-layer film/sheet forming machine (25 mm (φ, available from TPIC Co., Ltd.), an original sheet having a thickness of 3.8 mm (size: 10 cm×10 cm or more) was obtained from the resin composition (b) at an extruding temperature of 230° C. The original sheet was subjected to simultaneous biaxial stretching (5 times×5 times) at 140° C. using a film stretching apparatus (KARO-IV, available from Bruckner) to obtain a biaxially oriented sheet B having a thickness of 0.15 mm.

[Biaxially Oriented Sheet C]

Using a three-type three-layer film/sheet forming machine (25 mm (φ, available from TPIC Co., Ltd.), an original sheet having a thickness of 3.8 mm (size: 10 cm×10 cm or more) was obtained from the resin composition (c) at an extruding temperature of 230° C. The original sheet was subjected to simultaneous biaxial stretching (5 times×5 times) at 140° C. using a film stretching apparatus (KARO-IV, available from Bruckner) to obtain a biaxially oriented sheet C having a thickness of 0.15 mm.

[Biaxially Oriented Sheet AB and Biaxially Oriented Film AB]

Using a three-type three-layer film/sheet forming machine (25 mm φ, available from TPIC Co., Ltd.), coextrusion was performed at an extruding temperature of 230° C. such that the resin composition (a) was extruded on the touch roll side and the resin composition (b) was extruded on the cast roll side, and thus, original sheets (thickness: 3.8 mm and 2.5 mm, size: 10 cm×10 cm or more) were obtained. The original sheets were each subjected to simultaneous biaxial stretching (5 times×5 times) at 165° C. using a film stretching apparatus (KARO-IV, available from Bruckner) to obtain a coextruded biaxially oriented sheet AB having a thickness of 0.15 mm and a coextruded biaxially oriented film AB having a thickness of 0.10 mm. The thickness ratio of the resin composition (a) to the resin composition (b) was 91/9.

[Biaxially Oriented SHEET BA and biaxially Oriented Film BA]

Using a three-type three-layer film/sheet forming machine (25 mm φ, available from TPIC Co., Ltd.), coextrusion was performed at an extruding temperature of 230° C. such that the resin composition (b) was extruded on the touch roll side and the resin composition (a) was extruded on the cast roll side, and thus, original sheets (thickness: 3.8 mm and 2.5 mm, size: 10 cm×10 cm or more) were obtained. The original sheets were each subjected to simultaneous biaxial stretching (5 times×5 times) at 165° C. using a film stretching apparatus (KARO-IV, available from Bruckner) to obtain a coextruded biaxially oriented sheet BA having a thickness of 0.15 mm and a coextruded biaxially oriented film BA having a thickness of 0.10 mm. The thickness ratio of the resin composition (b) to the resin composition (a) was 9/91.

[Biaxially Oriented Sheet AC]

A biaxially oriented sheet AC was produced in the same manner as the biaxially oriented sheet AB except that the resin composition (c) was used instead of the resin composition (b).

[Biaxially Oriented Sheet CA]

A biaxially oriented sheet CA was produced in the same manner as the biaxially oriented sheet BA except that the resin composition (c) was used instead of the resin composition (b).

[Biaxially Oriented Sheet BAB]

Using a three-type three-layer film/sheet forming machine (25 mm φ, available from TPIC Co., Ltd.), coextrusion was performed at an extruding temperature of 230° C. so as to form a structure of resin composition (b)/resin composition (a)/resin composition (b), and thus, an original sheet having a thickness of 3.8 mm (size: 10 cm×10 cm or more) was obtained. The original sheet was subjected to simultaneous biaxial stretching (5 times×5 times) at 165° C. using a film stretching apparatus (KARO-IV, available from Bruckner) to obtain a coextruded biaxially oriented sheet BAB having a thickness of 0.15 mm. The thickness ratio was 8/84/8.

[Biaxially Oriented Sheet D]

Using a three-type three-layer film/sheet forming machine (25 mm φ, available from TPIC Co., Ltd.), an original sheet having a thickness of 5.0 mm (size: 10 cm×10 cm or more) was obtained from the resin composition (d) at an extruding temperature of 230° C. Then, the original sheet was subjected to simultaneous biaxial stretching (5 times×5 times) at 160° C. using a film stretching apparatus (KARO-IV, available from Bruckner) to obtain a biaxially oriented sheet D having a thickness of 0.20 mm.

[Un-Oriented Sheet E]

Using a three-type three-layer film/sheet forming machine (25 mm φ, available from TPIC Co., Ltd.), a un-oriented sheet E having a thickness of 0.20 mm (size: 10 cm×10 cm or more) was obtained from the resin composition (e) at an extruding temperature of 230° C.

The physical properties of the resin composition and physical properties of the biaxially oriented sheet-like part are shown in Tables 1 and 2.

2. Production of Multilayer Sheet and Container

Example 1

The biaxially oriented sheet AB and the biaxially oriented sheet BA were laminated in this order to prepare a precursor in which both outermost layers were the biaxially oriented sheet A. The respective interlayers of the precursor were thermally fusion bonded using, as a heating element, a roll forming machine (induction heated jacket rolls, available from Tokuden Co., Ltd., model: JR-D0-W, roll diameter: 200 mmφ×2, length of roll surface: 410 mm), to produce a multilayer sheet as a laminate. The forming condition was as shown in Table 3.

The multilayer sheet was cut into a 250 mm square, and formed into a tray-shaped container using a small vacuum pressure forming machine (model: FVS-500) available from Wakisaka Engineering Co., Ltd. under the conditions of temperatures of upper and lower heaters of 360° C., a heating time of 36 seconds, and a compressed air pressure of 0.6 MPa. The shape of the container as a formed article was 130 mm in length, 100 mm in width, and 25.4 mm in depth. The length of the flat portion (bottom) was 90 mm, the width was 60 mm, and the thickness was 0.95 times the thickness of the multilayer sheet. At this time, the container was formed such that the length direction of the container was the MD of the sheet. The multilayer sheet and the container were evaluated as described below. For measurement of rigidity, cold impact resistance, and transparency of the container, a test piece obtained from the flat portion (bottom) was used.

Example 2

The biaxially oriented sheets AB, BAB, and BA were laminated in this order to prepare a precursor in which both outermost layers were the biaxially oriented sheet A. The multilayer sheet and the container were produced in the same manner as in Example 1, and then evaluated.

Example 3

The biaxially oriented sheets AB, BAB, BAB, and BA were laminated in this order to prepare a precursor in which both outermost layers were the biaxially oriented sheet A. The multilayer sheet and the container were produced in the same manner as in Example 1, and then evaluated.

Example 4

The biaxially oriented sheets AB, BAB, BAB, and BA were laminated in this order to prepare a precursor in which both outermost layers were the biaxially oriented sheet A. This precursor was cut into a 250 mm square, and formed into a tray-shaped container using a small vacuum pressure forming machine (model: FVS-500) available from Wakisaka Engineering Co., Ltd. under the conditions of temperatures of upper and lower heaters of 360° C., a heating time of 36 seconds, and a compressed air pressure of 0.6 MPa. The shape of the container was the same as the shape of the container produced in Example 1.

Example 5

A multilayer sheet and a container were produced in the same manner as in Example 1 except that the biaxially oriented sheet AC was used instead of the biaxially oriented sheet AB and the biaxially oriented sheet CA was used instead of the biaxially oriented sheet BA. Then, the sheet and the container were evaluated.

Example 6

A multilayer sheet and a container were produced in the same manner as in Example 1 except that the biaxially oriented film AB was used instead of the biaxially oriented sheet AB and the biaxially oriented film BA was used instead of the biaxially oriented sheet BA. Then, the sheet and the container were evaluated.

Comparative Example 1

A comparative sheet and container were produced using only the biaxially oriented sheet A in the same manner as in Example 1, and then evaluated.

Comparative Examples 2 and 3

Comparative sheets and containers were produced in the same manner as in Example 2 except that the heating roll temperature was changed, and then, the sheets and the containers were evaluated. In the multilayer sheet obtained in Comparative Example 2, the layers were not sufficiently fusion bonded. In Comparative Example 3, since respective layers were melted by using a stretching roll, a multilayer structure was not observed in the resulting sheet.

Comparative Example 4

A comparative sheet and container were produced in the same manner as in Example 2 except that the number of biaxially oriented sheets BAB was changed, and then, the sheet and the container were evaluated.

Comparative Example 5

A comparative sheet and container were produced using only the biaxially oriented sheet D in the same manner as in Example 1, and then evaluated.

Reference Example 1

A reference sheet and container were produced using the un-oriented sheet E in the same manner as in Example 1, and then evaluated.

TABLE 1

|  | Resin composition (a) | Resin composition (b) | Resin composition (c) | Resin composition (d) | Resin composition (e) |
|---|---|---|---|---|---|
| Main layer/adhesive layer | For main layer | For adhesive layer | For adhesive layer | For adhesive layer | For Reference Example (un-oriented sheet) |
| Polymer type | Polymer 1 HOMO | Polymer 2 RACO | Polymer 2 RACO | Polymer 1 HOMO | Polymer 3 HOMO |
| Ethylene-derived unit content in component (A1) [wt %] | 0.0 | — | — | 0.0 | 0.0 |
| Component (A2) [wt %] | 0 | 0 | 0 | 0 | 0 |
| Ethylene-derived unit content in component (a) [wt %] | — | 4.0 | 4.0 | — | — |
| Amount of polymer to be blended [parts by weight] | 60 | 100 | 99.7 | 100 | 100 |
| Amount of talc to be blended [parts by weight] | 40 | 0 | 0.3 | 0 | 0 |
| MFR (230° C., 2.16 kg) [g/10 min] | 7.0 | 7.5 | 7.5 | 7.0 | 3.0 |
| TmF (° C.) | 164 | — | — | — | — |
| TmN (° C.) | — | 138 | 138 | 164 | 164 |

TABLE 2

| | Biaxially oriented sheet-like part, un-oriented sheet-like part | | | | | | | | | | |
|---|---|---|---|---|---|---|---|---|---|---|---|
| | A Single-layer extrusion (a) | B Single-layer extrusion (b) | C Single-layer extrusion (c) | AB Two-type two-layer co-extrusion (a)/(b) | BA Two-type two-layer co-extrusion (b)/(a) | AC Two-type two-layer co-extrusion (a)/(c) | CA Two-type two-layer co-extrusion (c)/(a) | BAB Two-type three-layer co-extrusion (b)/(a)/(b) | D Single-layer extrusion (d) | E Single-layer extrusion (e) |
| Thickness of original sheet (mm) | 3.8 | 3.8 | 3.8 | 3.8  2.5 | 3.8  2.5 | 3.8 | 3.8 | 3.8 | 5.0 | 0.20 |
| Thickness ratio (layer 1/layer 2, layer 1/layer 2/layer 1) | — | — | — | 91/9  91/9 | 9/91  9/91 | 91/9 | 9/91 | 8/84/8 | — | — |
| Thickness of biaxially oriented sheet-like part [one sheet] (mm) | 0.15 | 0.15 | 0.15 | 0.15  0.10 | 0.15  0.10 | 0.15 | 0.15 | 0.15 | 0.20 | — |
| Biaxial stretching temperature (° C.) | 160 | 140 | 140 | 165  165 | 165  165 | 165 | 165 | 165 | 160 | — |
| Biaxial stretch ratio | 5 × 5 | 5 × 5 | 5 × 5 | 5 × 5  5 × 5 | 5 × 5  5 × 5 | 5 × 5 | 5 × 5 | 5 × 5 | 5 × 5 | — |
| TmF' (° C.) | 169 | — | — | 169  169 | 169  169 | 169 | 169 | 169 | — | — |
| TmN' (° C.) | — | 140 | 140 | 140  140 | 140  140 | 140 | 140 | 140 | 169 | — |
| TmF' − TmN' (° C.) | — | — | — | 29  29 | 29  29 | 29 | 29 | 29 | — | — |

TABLE 3

| | Example | | | | | |
|---|---|---|---|---|---|---|
| | 1 | 2 | 3 | 4 | 5 | 6 |
| Structure | AB/BA | AB/BAB/BA | AB/BAB/BAB/BA | AB/BAB/BAB/BA | AC/CA | AB/BA |
| Total number of layers | 3 | 5 | 7 | 7 | 3 | 3 |
| Number of biaxially oriented sheet-like parts | 2 | 3 | 4 | 4 | 2 | 2 |
| Total thickness of precursor (mm) | 0.30 | 0.45 | 0.60 | 0.60 | 0.30 | 0.20 |
| Ratio of total thickness of layer F to layer N (DF/DN) | 10 | 7.8 | 7.0 | 7.0 | 10 | 10 |
| Heating roll temperature T (° C.) | 155 | 155 | 155 | Preparation of multilayer sheet is omitted | 155 | 155 |
| Heating roll forming take-up speed (m/min) | 0.1 | 0.1 | 0.1 | | 0.1 | 0.1 |
| TmF (° C.) | 169 | 169 | 169 | | 169 | 169 |
| TmN (° C.) | 140 | 140 | 140 | | 140 | 140 |
| TmF − TmN (° C.) | 29 | 29 | 29 | | 29 | 29 |

TABLE 3-continued

| | | | | | | |
|---|---|---|---|---|---|---|
| $Tm_{out} - T$ | 14 | 14 | 14 | | 14 | 14 |
| Thickness of multilayer sheet (mm) | 0.30 | 0.45 | 0.60 | (0.60) | 0.30 | 0.20 |
| Rigidity of multilayer sheet | | | | | | |
| Tensile modulus (MPa) | 4,500 | 4,300 | 3,900 | — | 4,500 | 4,500 |
| Cold impact resistance of multilayer sheet | | | | | | |
| In-plane impact strength (−30° C.) (J) | 8.0 | 8.8 | 9.0 | — | 8.0 | 5.3 |
| Container forming temperature (° C.) | 165 | 165 | 165 | 165 | 165 | 165 |
| Thickness of container (mm) | 0.29 | 0.43 | 0.57 | 0.57 | 0.29 | 0.19 |
| Rigidity of container | | | | | | |
| Flexural modulus (MPa) | 4,700 | 4,500 | 4,100 | 3,300 | 4,700 | 4,700 |
| Cold impact resistance of container | | | | | | |
| In-plane impact strength (−30° C.) (J) | 8.4 | 9.4 | 9.5 | 4.4 | 8.4 | 7.5 |
| Heat resistance of container | | | | | | |
| Heat-resistant temperature in buckling test (° C.) | 139 | 148 | 160 | 143 | 139 | 125 |
| Presence or absence of delamination of container | No | No | No | No | No | No |

| | Comparative Example | | | | | Reference Example |
|---|---|---|---|---|---|---|
| | 1 | 2 | 3 | 4 | 5 | Un-oriented sheet |
| Structure | A | AB/BAB/BA | AB/BAB/BA | AB/BAB/···/BAB/BA | D | E |
| Total number of layers | 1 | 5 | 5 | 15 | 1 | |
| Number of biaxially oriented sheet-like parts | 1 | 3 | 3 | 8 | 1 | 1[1)] |
| Total thickness of precursor (mm) | 0.15 | 0.45 | 0.45 | 1.20 | 0.20 | 0.20[2)] |
| Ratio of total thickness of layer F to layer N (DF/DN) | — | 7.8 | 7.8 | 6.0 | — | — |
| Heating roll temperature T (° C.) | 155 | 135 | 175 | 155 | 155 | — |
| Heating roll forming take-up speed (m/min) | 0.1 | 0.1 | 0.1 | 0.1 | 0.1 | — |
| TmF (° C.) | 169 | 169 | 169 | 169 | — | — |
| TmN (° C.) | — | 140 | 140 | 140 | 169 | — |
| TmF − TmN (° C.) | — | 29 | 29 | 29 | — | — |
| $Tm_{out} - T$ | 14 | 34 | −6 | 14 | 14 | — |
| Thickness of multilayer sheet (mm) | 0.15 | 0.45 | 0.45 | 1.20 | 0.22 | 0.20[2)] |
| Rigidity of multilayer sheet | | | | | | |
| Tensile modulus (MPa) | 4,000 | 2,600 | 2,400 | 3,300 | 2,200 | 1,300[2)] |
| Cold impact resistance of multilayer sheet | | | | | | |
| In-plane impact strength (−30° C.) (J) | 1.4 | 0.9 | 1.4 | 11 | 0.5 | 0.1[2)] |
| Container forming temperature (° C.) | 165 | 165 | 165 | 165 | 165 | 165 |
| Thickness of container (mm) | 0.14 | 0.43 | 0.43 | 1.14 | 0.19 | 0.19 |
| Rigidity of container | | | | | | |
| Flexural modulus (MPa) | 4,100 | 2,700 | 2,500 | 3,400 | 2,200 | 1,370 |
| Cold impact resistance of container | | | | | | |
| In-plane impact strength (−30° C.) (J) | 1.5 | 1.0 | 1.5 | 12 | 3.0 | 0.1 |
| Heat resistance of container | | | | | | |
| Heat-resistant temperature in buckling test (° C.) | 124 | 122 | 105 | 165 | 113 | 90 |

TABLE 3-continued

| Presence or absence of delamination of container | No | Yes | No | Yes | No | No |

[1] Number of un-oriented sheets
[2] Physical properties of un-oriented sheet

3. Evaluation
(1) MFR
With respect to the polymer, 0.05 g of H-BHT, available from Honshu Chemical Industry Co., Ltd. was added to 5 g of a sample, the mixture was homogenized by dry blending, and then the MFR was measured under the conditions of a temperature of 230° C. and a load of 2.16 kg according to JIS K7210-1. With respect to the resin composition, the MFR was measured under the conditions of a temperature of 230° C. and a load of 2.16 kg in accordance with JIS K7210-1.
(2) Ethylene-Derived Unit Content in Polymer (wt %)
A spectrum of $^{13}$C-NMR for the sample dissolved in a mixed solvent of 1,2,4-trichlorobenzene and deuterated benzene was obtained using AVANCE III HD400, available from Bruker ($^{13}$C resonance frequency: 100 MHz) under the conditions of measurement temperature: 120° C., flip angle: 45 degrees, pulse interval: 7 seconds, sample rotating speed: 20 Hz, and number of scans: 5,000 times. The ethylene-derived unit content (wt %) in the polymer was determined using the obtained spectrum by the method described in the literature of M. Kakugo, Y. Naito, K. Mizunuma and T. Miytake, Macromolecules, 15, p. 1150 to 1152 (1982).
(3) Melting Point Measured by DSC
Approximately 5 mg of a sample taken from a resin composition pellet or a biaxially oriented sheet-like part was weighed with an electronic balance. Thereafter, the sample was maintained at 30° C. for 5 minutes and then heated to 230° C. at a heating rate of 10° C./min by a differential scanning calorimeter (DSC) (Q-200, available from TA Instruments) to obtain a melting curve. The peak temperature of the melting curve was taken as the melting point. In the case where a plurality of melting point peaks were observed in each of the layers, the temperature of the maximum peak was defined as the melting point.
(4) Rigidity (Tensile Modulus, Flexural Modulus)
The obtained sheet was formed into a type A2 multi-purpose test piece specified in JIS K7139 was prepared through machine processing. Tensile modulus was measured in accordance with JIS K7161-2, using a precision universal testing machine (Autograph AG-X 10 kN), available from Shimadzu Corporation, under the conditions of a temperature of 23° C., a relative humidity of 50%, and a test speed of 1 mm/min. A flat portion (bottom) of the container was cut to obtain a type B3 test piece (width 10 mm, length 80 mm) specified in JIS K7139. Using a precision universal testing machine (autograph AG-X 10 kN) available from Shimadzu Corporation, the flexural modulus was measured under the conditions of a temperature of 23° C., a relative humidity of 50%, a span of 64 mm, and a test speed of 2 mm/min.
(5) Cold Impact Resistance (In-Plane Impact Strength)
The puncture energy (J) for the obtained sheet was determined in accordance with JIS K7211-2 using Hydroshot HITS-P10, available from Shimadzu Corporation. In a chamber adjusted to −30° C., a test piece for measurement was placed on a support base having a hole with an inner diameter of 40 mmφ) and secured with a sample holder having an inner diameter of 76 mmφ. Then, the test piece was struck with a striker having a diameter of 12.7 mmφ and having a hemispherical striking surface at an impact velocity of 1 msec. The average value of the puncture energies of four test pieces for measurement was taken as the in-plane impact strength. In addition, a test piece having the same shape was prepared from the bottom of the container, and the in-plane impact strength of the container was evaluated under the same conditions.
(6) Delamination State of Container
The container was visually observed, and the presence or absence of delamination was evaluated.
(7) Heat Resistance of Container
A tray-shaped container was placed on an aluminum plate so that the opening was in contact with the aluminum plate. The container was held in an oven set at each temperature for 1 hour in a state in which no load is applied. After opening the oven door, a load (640 g) was immediately placed on the container. After 10 seconds, the load was removed, the aluminum plate and the container were taken out from the oven. Then, the presence or absence of buckling of the container was visually checked. The temperature at which the container started to buckle (the heat-resistant temperature in the buckling test) was measured to evaluate the heat resistance.

It is apparent that the multilayer sheet of the present invention have excellent transparency and mechanical properties and can be formed into a formed article having excellent transparency and mechanical properties.

REFERENCE SIGNS LIST

1 Multilayer sheet
F Filler layer F
N Neat layer N
1' Precursor
F' Biaxially oriented polypropylene sheet-like part
N' Biaxially oriented polypropylene sheet-like part
f Resin composition constituting layer F
n Resin composition constituting layer N
F" Un-oriented polypropylene sheet (original sheet)
N" Un-oriented polypropylene sheet (original sheet)
C' Biaxially oriented coextruded sheet-like part
2 Un-oriented sheet preparation step
3 Stretching step
4 Lamination step
5 Interface fusion bonding step

The invention claimed is:
1. A polypropylene multilayer sheet comprising:
a biaxially oriented polypropylene layer F having a melting point TmF; and
a biaxially oriented polypropylene layer N having a melting point TmN,
the biaxially oriented polypropylene layer N and the biaxially oriented polypropylene layer F being alternately laminated,
the polypropylene multilayer sheet having a thickness of 0.15 to 3.0 mm, wherein
the polypropylene multilayer sheet is produced by a process which comprises thermally fusion bonding interlayers of a precursor in which a polypropylene biaxially oriented sheet-like part for the layer F and a polypropylene biaxially oriented sheet-like part for the layer N are laminated, and the polypropylene multilayer sheet has a multilayer structure, wherein TmF>TmN, a total number of layers is 3 to 11, the biaxially oriented polypropylene layer F is formed of a resin composition containing: a polypropylene-based resin as a component (A); and an inorganic filler as a component (B), a weight ratio of the component (B)/[the component (A)+the component (B)] is 0.5 to 60 wt %, the biaxially oriented polypropylene layer N is formed of a resin composition containing: a polypropylene-based resin as a component (a); and the component (B) as an optional component, and a weight ratio of the component (B)/[the component (a)+the component (B)] is 0 to 10 wt % and wherein the precursor includes a coextruded layer in which the layer F and the layer N are coextruded as alternately laminated, and the coextruded layer has a thickness of 0.08 to 0.50 mm, and a total number of the coextruded layers is 2 to 6.

2. The polypropylene multilayer sheet according to claim 1, wherein the component (A) is a polypropylene-based resin including a component (A1) and an optional component (A2), the component (A1) is 100 to 60 wt % of a propylene (co)polymer containing 0 to 1 wt % of a comonomer-derived unit selected from C2 to C10 α-olefins (excluding C3 α-olefins), the component (A2) is 0 to 40 wt % of an ethylene-α-olefin copolymer containing 10 to 90 wt % of an ethylene-derived unit, and the component (A) has a melt flow rate (MFR) (230° C., load 2.16 kg) of 0.1 to 15 g/10 min.

3. The polypropylene multilayer sheet according to claim 1, wherein the component (a) is selected from a propylene homopolymer; a propylene random copolymer containing 5 wt % or less of at least one comonomer selected from C2 to C10 α-olefins (excluding C3 α-olefins); or a combination thereof.

4. The polypropylene multilayer sheet according to claim 1, wherein a ratio DF/DN of a total thickness DF of the biaxially oriented polypropylene layer F to a total thickness DN of the biaxially oriented polypropylene layer N is 1 to 30.

5. The polypropylene multilayer sheet according to claim 1, wherein the inorganic filler is a plate-like inorganic filler.

6. The polypropylene multilayer sheet according to claim 5, wherein the plate-like inorganic filler is talc.

7. The polypropylene multilayer sheet according to claim 1, wherein a weight ratio of the component (B)/[the component (A)+the component (B)] in the biaxially oriented polypropylene layer F is 20 to 55 wt %.

8. A method for producing the polypropylene multilayer sheet according to claim 1, the method comprising:

a step 1 of preparing a precursor in which a layer F having a melting point TmF, and a layer N having a melting point TmN are laminated such that the layers F are not adjacent to each other, wherein the precursor includes a coextruded layer in which the layer F and the layer N are coextruded as alternately laminated, and the coextruded layer has a thickness of 0.08 to 0.50 mm, and a total number of the coextruded layers is 2 to 6; and a step 2 of bringing a heating element into contact with an outermost layer of the precursor to thermally fusion bond interlayers of the polypropylene multilayer sheet, wherein TmF>TmN.

9. The production method according to claim 8, wherein a melting point $Tm_{out}$ of the outermost layer and a temperature T of the heating element satisfy the following condition:

$Tm_{out} - T \geq 4$ (° C.)

where the melting point is measured by a differential scanning calorimeter (DSC) under the condition of a heating rate of 10° C./min from 30° C. to 230° C.

10. The production method according to claim 8, wherein the step 1 includes a step of coextruding a raw material of the layer F and a raw material of the layer N to prepare a coextruded original sheet having a plurality of layers, and preparing the precursor using a product obtained by biaxially stretching the coextruded original sheet.

11. A formed article obtained by forming the polypropylene multilayer sheet according to claim 1.

12. The formed article according to claim 11, which is a container.

13. A precursor of the polypropylene multilayer sheet according to claim 1, wherein a biaxially oriented polypropylene layer F having a melting point TmF, and a biaxially oriented polypropylene layer N having a melting point TmN are laminated such that the biaxially oriented polypropylene layers F are not adjacent to each other, and the precursor has one or more interfaces that are not fusion bonded and includes a coextruded layer in which the layer F and the layer N are coextruded as alternately laminated, and the coextruded layer has a thickness of 0.08 to 0.50 mm, and a total number of the coextruded layers is 2 to 6.

14. A polypropylene multilayer sheet produced by the method according to claim 8.

* * * * *